United States Patent [19]

Koch

[11] Patent Number: 4,669,910
[45] Date of Patent: Jun. 2, 1987

[54] METAL FITTING PART FOR A DETACHABLE CONNECTION BETWEEN PANELS

[75] Inventor: Gerhard Koch, Nagold, Fed. Rep. of Germany

[73] Assignee: Häfele KG, Fed. Rep. of Germany

[21] Appl. No.: 803,570

[22] Filed: Dec. 2, 1985

[30] Foreign Application Priority Data

Dec. 7, 1984 [DE] Fed. Rep. of Germany ....... 3444696

[51] Int. Cl.⁴ .......................... B25G 3/00; F16B 7/08
[52] U.S. Cl. .................................... 403/231; 403/245; 403/407.1
[58] Field of Search ..................... 403/407.1, 231, 323, 403/245, 263, 350, 354, 322, 376, 380, 405.1, 353, 264, 230, DIG. 10

[56] References Cited

U.S. PATENT DOCUMENTS

| 4,163,618 | 8/1979 | Giovannetti | 403/245 |
| 4,360,282 | 11/1982 | Koch | 403/231 |
| 4,505,610 | 3/1985 | Röck et al. | 403/407.1 |

FOREIGN PATENT DOCUMENTS

| 2308842 | 11/1973 | Fed. Rep. of Germany | 403/264 |
| 2643354 | 3/1978 | Fed. Rep. of Germany | 403/353 |

Primary Examiner—Cornelius J. Husar
Assistant Examiner—Peter M. Cuomo
Attorney, Agent, or Firm—McGlew and Tuttle

[57] ABSTRACT

A metal fitting for a detachable connection between panels, which are at an angle to one another, especially between furniture panels, comprises an approximately cylindrical tension part (3) which is rotatably supported in the recess (2) of a mounting (1). The mounting (1) is attached to one panel and a tension bolt (10), which engages the tension part (3), is attached to the other panel. Recess (2) is provided at its one face (4) with a supporting surface (5) for the purpose of supporting the tension part (3) in the mounting (1). In order to enable the mounting (1) to be manufactured simply and the tension part (3) to be inserted easily into the mounting (1), the other face (13) of the recess (2) is fashioned to be open and has only a nose (14), which rises inwardly above the tension part (3). The tension part (3), in turn, is provided with a longitudinal slot (15) which corresponds to the dimensions of the nose (14). In order to insert it in mounting (1), tension part (3) is twisted so that the nose (14) and the longitudinal slot (15) are aligned. Tension part (3) is then merely pushed into the mounting (1). By means of a subsequent twisting of the mounting (3), the latter is secured in the axial direction.

6 Claims, 2 Drawing Figures

U.S. Patent  Jun. 2, 1987  4,669,910
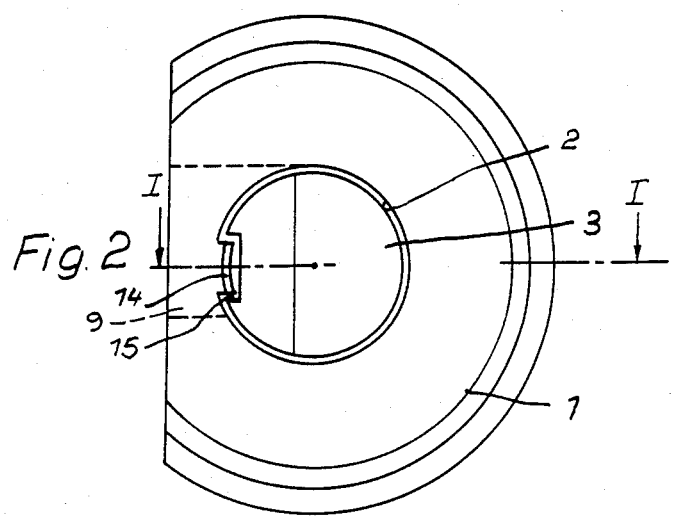
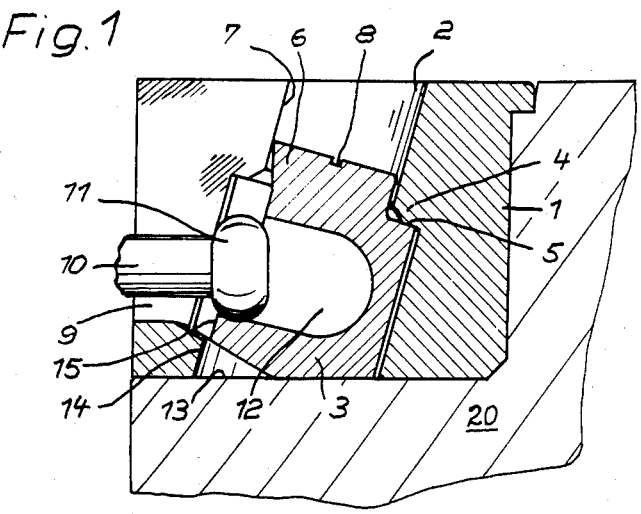

4,669,910

METAL FITTING PART FOR A DETACHABLE CONNECTION BETWEEN PANELS

FIELD AND BACKGROUND OF THE INVENTION

The invention relates to a metal fitting for a detachable connection between two panels, which are at an angle to one another, especially between furniture panels.

Metal fittings of this type, in which an approximately cylindrical tension part is supported in the recess of a mounting so that it can rotate, are already known. Moreover, the mounting is arranged in one of the panels, while a tension bolt is attached to the other. The head of this tension bolt is taken up by the tension part. an approximately ring-shaped supporting surface is provided at one face of the recess for the purpose of axially fixing the tension part within the mounting, while the other face is closed completely. In order to insert the tension part in the mounting, it has been necessary, until now, to manufacture the mounting so that it is split along the longitudinal axis, to insert the tension part in one half of the mounting, then to attach the second half and, if necessary, to combine the two halves permanently. This results in a relatively complicated and expensive manufacturing process.

SUMMARY OF THE INVENTION

It is an object of the present invention to provide as simple a metal fitting as possible, the mounting being fashioned as a connected part, into which the tension part can easily be inserted. This is accomplished by the fact that the other face of the mounting is fashioned to be open and has an inwardly directed nose or the like, which rises above the tension part. the tension part is provided with a longitudinal slot that matches the nose. The tension part is now simply pushed into the mounting with the slot pointing in the direction of the nose and then fixed in the axial direction by slightly twisting the slot relative to the nose. The mounting may moreover consist of a single piece and no further measures are subsequently required in order to hold the parts together.

Preferably, the nose is arranged on the mounting opposite a passage opening for the tension bolt and the longitudinal slot is provided on the tension part at the inlet opening for the tension bolt head. In this way, the tension part, on being inserted, is immediately in the correct position for introducing the tension bolt head and, during the subsequent twisting for the purpose of stressing, the axial position of the tension part is then also assured.

Accordingly, a further object of the present invention is to provide a metal fitting for a detachable connection between two panels which are at an angle to each other, comprising an approximately cylindrical tension part which is supported rotatably in a recess of a mounting fixture in one of the panels and which holds the head of a tension bolt attached to the other panel. The mounting has a supporting surface for the tension part at one face of the recess. The recess, which is open at its outer face, has an inwardly directed nose or the like which rises above the tension part. The tension part is provided with a longitudinal slot that is matched to the nose.

A further object of the invention is to provide a metal fitting which is especially suited for connections between furniture panels, and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

The drawings show an example of the invention wherein:

FIG. 1 is a cross sectional view taken on line I—I of FIG. 1 and through a mounting with an inserted tension part, and a view of a portion of a tension bolt; and FIG. 2 is a bottom plan view of the mounting with the tension part.

DESCRIPTION OF THE PREFERRED EMBODIMENT

An approximately cylindrical tension part 3 is mounted so that it can rotate in the recess 2 of the mounting 1. The tension part 3 is moreover supported at the one face 4 of the recess 2 on a ring-shaped supporting surface 5. The projection 6 of the tension part 3 protrudes into an offset elongation 7 of the recess 2 and has a cross slot 8 for applying a screwdriver. A tension bolt 10 protrudes with its head portion 11 through opening 9 of the mounting 1 into the tension part 3. Tension part 3 has a tensioning slot 12 of known shape and, by twisting the tension part by means of a screwdriver, the tension head 11 is pulled into the tension part 3. Recess 2 is open at its face 13 and has a nose 14, which rises up towards the inside, while the tension part 3 is provided with a longitudinal slot 15 that corresponds to the dimensions of the nose 14. Moreover, the nose 14 is opposite the passage opening 9 of the mounting 1 for the tension bolt 10 and the slot 15 at the tension part 3 is provided at the inlet opening for the tension bolt head 11.

For inserting the tension part 3 is the mounting 1, tension part 3 is twisted until the nose 14 is aligned with slot 15. Tension part 3 can then be pushed into the recess 2 of the mounting 1 from the bottom as seen in FIG. 1. Tension bolt 10 is then inserted in this position and after being twisted, tension part 3 is secured in the axial direction by nose 14.

One of the panels, which are intended to be connected, is shown at 20 in FIG. 1. Usually, the free end of the tension bolt 10 is fashioned as a threaded bolt and screwed into another panel (not shown). For the mounting 1 on the other hand, a borehole is provided in the panel 20, into which the mounting 1 is pushed so that the screw slot 8 of the tension part is accessible from the outside.

While a specific embodiment of the invention has been shown and described in detail to illustrate the application of the principles of the invention, it will be understood that the invention may be embodied otherwise without departing from such principles.

What is claimed is :

1. A metal fitting for establishing a detachable connection between two panels that are at an angle to each other, particularly between furniture panels, comprising a one piece mounting member for fixing to one of the panels, said mounting member having a recess with a supporting surface near one end thereof and an opposite open end, said mounting member having a nose extending inwardly of said recess near said opposite open end, an approximately cylindrical tension part rotatably mounted in said recess and engaged against said supporting surface, said tension part having an internal tensioning slot for receiving a tension bolt head and an axially extending slot substantially matching in cross-sectional shape to a cross-sectional shape of said nose whereby said tension part can be inserted into said recess through said opposite open end thereof with said axially extending slot aligned with said nose and a tension bolt for fixing to another panel and having said bolt head for insertion into said tensioning slot.

2. A metal fitting according to claim 1, wherein said mounting member has a passage opening extending radially into said recess for receiving said tension bolt, said nose being opposite from said passage opening and in said recess.

3. A metal fitting according to claim 2, wherein said tensioning slot has an inlet end for receiving said tension bolt head, said axially extending slot communicating with said inlet opening of said tensioning slot.

4. A metal fitting according to claim 3, wherein said recess has an opposite open end adjacent said supporting face which is of smaller diameter than a portion of said recess adjacent said one open end, said cylindrical tension part having a small diameter projection extending into said opposite open end with a screwdriver engaging slot therein for facilitating rotation of said tension part.

5. A metal fitting according to claim 4, wherein said mounting member is in the form of a cylinder having a cord cut therefrom and having an axis, an axis of rotation of said tension part being at an angle to said axis of said mounting member.

6. A metal fitting according to claim 3 wherein said mounting member is in the form of a cylinder having a cord cut therefrom and having an axis, an axis of rotation of said tension part being at an angle to said axis of said mounting member.

* * * * *